(12) United States Patent
Coman et al.

(10) Patent No.: US 8,947,974 B2
(45) Date of Patent: Feb. 3, 2015

(54) SEISMIC MEASUREMENTS WHILE DRILLING

(75) Inventors: Radu Coman, Niedersachsen (DE); Michael Neubert, Lower Saxony (DE); Holger Mathiszik, Eicklingen (DE); Michael Koppe, Niedersachsen (DE)

(73) Assignee: Baker Hughes Incorporated, Houston, TX (US)

( * ) Notice: Subject to any disclaimer, the term of this patent is extended or adjusted under 35 U.S.C. 154(b) by 821 days.

(21) Appl. No.: 12/815,864

(22) Filed: Jun. 15, 2010

(65) Prior Publication Data

US 2010/0322030 A1 Dec. 23, 2010

Related U.S. Application Data

(60) Provisional application No. 61/219,523, filed on Jun. 23, 2009.

(51) Int. Cl.
*G01V 1/50* (2006.01)
*G01V 1/42* (2006.01)

(52) U.S. Cl.
CPC .................................... *G01V 1/42* (2013.01)
USPC .............................................. 367/27; 367/38

(58) Field of Classification Search
CPC ..................................................... G01V 1/42
USPC .................. 367/15, 21, 27, 38, 40, 50, 51, 57
See application file for complete search history.

(56) References Cited

U.S. PATENT DOCUMENTS

| | | | | |
|---|---|---|---|---|
| 4,058,791 A | * | 11/1977 | Martin et al. | 367/42 |
| 4,314,347 A | | 2/1982 | Stokely | |
| 5,424,999 A | * | 6/1995 | Manin | 367/21 |
| 6,591,193 B2 | * | 7/2003 | Krebs et al. | 702/1 |
| 6,898,147 B2 | | 5/2005 | Jenner et al. | |
| 8,082,107 B2 | * | 12/2011 | Higginbotham et al. | 702/18 |
| 2006/0203614 A1 | | 9/2006 | Harmon | |
| 2007/0189119 A1 | | 8/2007 | Klotz et al. | |

OTHER PUBLICATIONS

Stack definition, Schlumberger online oilfield glossary, http://www.glossary.oilfield.slb.com/en/Terms/s/stack.aspx, downloaded Jan. 13, 2013.*
Meehan, Richard et al., "Case histories show real-time information reduces uncertainty," Oil & Gas Jnl, vol. 96, No. 20 (1998).
Moufarrej, Marwan et al., "Real-time borehole seismic runs on drillpipe connection schedules," Offshore, vol. 62, No. 4 (Apr. 2002).
Esmersoy, Cengiz et al., "Seismic MWD: Drilling in time, on time, it's about time," The Leading Edge, pp. 56-62 (Jan. 2005).

* cited by examiner

Primary Examiner — Daniel L Murphy
(74) Attorney, Agent, or Firm — Mossman Kumar & Tyler PC (57) ABSTRACT

A downhole tool starts recording seismic energy. During the recording time, a surface seismic source is activated a specified number of times with a nominally defined separation between successive. The downhole sensor receives seismic waves resulting from the activation, but the time of the shooting sequence is not known downhole. The recorded data stream is processed and converted in real-time into seismic traces. A predefined number of traces are stacked and the quality of this sliding stack is used to detect time of the shooting sequence. The method could be used to detect one or several shooting sequences during a measurement window.

20 Claims, 5 Drawing Sheets

SEISMIC MEASUREMENTS WHILE DRILLING

CROSS-REFERENCES TO RELATED APPLICATIONS

This application claims priority from U.S. Provisional Patent Application Ser. No. 61/219,523 filed on 23 Jun. 2009.

BACKGROUND OF THE DISCLOSURE

1. Field of the Disclosure

The present disclosure relates to an improved method of determining, while drilling in the earth with a drill bit, the positions of geologic formations in the earth. More particularly, it relates to a method for improving the quality of the processed data.

2. Description of the Related Art

Conventional reflection seismology utilizes surface sources and receivers to detect reflections from subsurface impedance contrasts. The obtained image often suffers in spatial accuracy, resolution, and coherence due to the long travel paths between source, reflector, and receiver. In particular, due to the two-way passage of seismic signals through a highly absorptive near surface weathered layer with a low, laterally varying velocity, subsurface images are poor quality. To overcome this difficulty, a technique commonly known as vertical seismic profiling (VSP) was developed to image the subsurface in the vicinity of a borehole. With VSP, a surface seismic source is used and signals are received at a single downhole receiver or an array of downhole receivers. This is repeated for different depths of the receiver (or receiver array). In offset VSP, a plurality of spaced apart sources are sequentially activated, enabling imaging of a larger range of distances than would be possible with a single source.

VSP measurements made during drilling operations are referred to as Seismic-while-drilling. The signals generated by seismic sources are reproducible and could be stacked. The other kind of data recorded by the seismic sensors is noise. We distinguish between background noise (drilling noise, circulation noise, rig noise, cultural noise, environmental noise) and spiky noise (e.g. due to hitting the drill string while connection; micro earthquakes close to the borehole). It is helpful to restrict seismic recording of data to low-noise periods. It is also helpful to stack the data. Because the noise is random, stacking the data increases the signal to noise ratio.

U.S. Pat. No. 7,299,884 to Mathiszik, having the same assignee as the present disclosure and the contents of which are incorporated herein by reference, discloses a method of making seismic measurements during drilling of a borehole by identifying suitable intervals when data quality are likely to be good, and making seismic measurements during those time intervals. Measurements may be made continuously with a seismic while drilling (SWD) system and the measured data may be stored in a working memory of a downhole processor along with quality control (QC) measurements. The QC data are analyzed and, based on the analysis, portions of the data in working memory may be recorded in permanent memory for retrieval. Alternatively, QC measurements may be made substantially continuously, and predictions may be made when data quality for SWD measurements are likely to be good. Recording of SWD data are then started based on the prediction.

The Seismic-while-drilling measurements include the VSP-while drilling (VSP-WD) method and the checkshot-WD (CS-WD) method. These methods permit updating of the geological model. In this way one can reduce the drilling risk and/or update the optimal well path. The importance of real-time processing is evident, but a full real-time processing isn't possible yet. One limitation of Seismic-while-drilling measurements is the small bandwidth of the uplinks and downlinks. The communication is done via mud telemetry, which is possible only while circulating. Hence when tripping in or tripping out, measurements are done without circulating between shooting windows, and it is not possible to send uplink signals and downlink signals. Even when mud telemetry is possible, the bandwidth available for uplink signals and downlink signals is very small.

Due to the small uplink bandwidth, the downhole tool must automatically detect and process the shooting sequence(s) downhole. Only the final results (e.g., the first-break time) are sent to the surface.

Because Seismic-while-drilling measurements need a quiet environment, they are done during natural drilling breaks (e.g., while connecting drill pipe segments). The measurement window might be set by the downhole tool itself (e.g. U.S. Pat. No. 7,299,884 to Mathiszik, having the same assignee as the present disclosure and the contents of which are incorporated herein by reference), or by the operator by sending a downlink. In both cases the measurement window is larger than the window of the shooting sequence, and the downhole tool must detect the exact shooting sequence automatically.

A robust detection of shooting sequences is very important if more than one sequence is performed during a measurement window. Usually, the length of a measurement window depends on the drilling mode (drilling or tripping). While drilling, the measurement window is short and often related to the connection time. Usually only one shooting sequence is performed during a measurement window, but several shooting sequences are also possible. While tripping, the measurement window usually includes several shooting sequences. Very often, one measurement window covers the whole tripping time. During the trip-in mode tens of shooting equences are performed. When the trip-in mode is finished, it is important that the results of several shooting sequences should be sent to the surface as soon as possible. A prerequisite for processing of a shooting sequence is the detection of the shooting windows. Of course, the exact shooting window(s) can be communicated with a downlink after the measurement(s). However, this procedure introduces a delay in the "real-time" processing, and sending an additional downlink is also very expensive.

There is a need for a method of automatically detecting the shot breaks downhole substantially in real-time. The present disclosure addresses this need.

SUMMARY OF THE DISCLOSURE

One embodiment of the disclosure is a method of producing a seismic trace during drilling operations using a bottomhole assembly (BHA) in a borehole in an earth formation. The method includes producing the seismic trace using a sliding stack based on a plurality of seismic signals over a time interval including an activation of a seismic source, using, to generate the plurality of seismic signals, a sensor on the BHA, the plurality of seismic signals being based on a sequence of seismic pulses having a predefined interval between successive seismic pulses.

Another embodiment of the disclosure is a system for evaluating an earth formation during conduct of drilling operations. The system includes: a bottomhole assembly (BHA) configured to be conveyed into a borehole for performing drilling operations; a seismic source at a surface location configured to be activated with a predefined sequence including a specified interval between successive activations; a sensor on the BHA configured to generate a plurality of seismic traces over a time interval that includes the activation of the seismic source; and a processor configured to perform a sliding stack of the plurality of seismic traces; and use a result of the sliding stack for further operations.

Another embodiment of the disclosure is computer-readable medium product having stored thereon instructions that when read by at least one processor cause the at least one processor to perform a method. The method includes: producing the seismic trace using a sliding stack based on a plurality of seismic signals over a time interval including an activation of a seismic source, using, to generate the plurality of seismic signals, a sensor on the BHA, the plurality of seismic signals being based on a sequence of seismic pulses having a predefined interval between successive seismic pulses.

BRIEF DESCRIPTION OF THE DRAWINGS

The present disclosure is best understood with reference to the accompanying figures in which like numerals refer to like elements, and in which.

DETAILED DESCRIPTION OF THE DISCLOSURE

The present disclosure is described with reference to acoustic sensors used in seismic while drilling methodology. However, this is not intended to be a limitation, and the method generally described herein can also be used with other types of sensor measurements.

Figure 1:
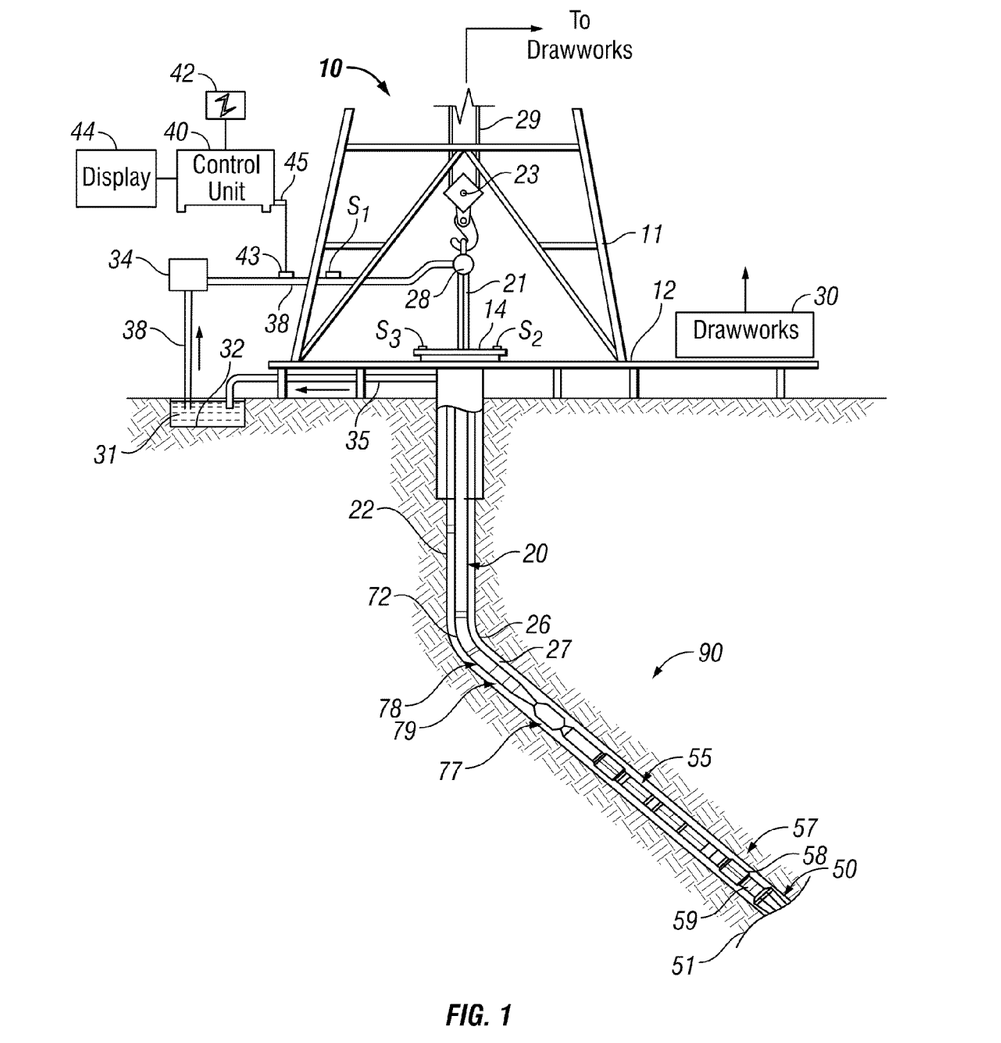
FIG. 1 shows a measurement-while-drilling device suitable for use with one embodiment according to the present disclosure.

FIG. 1 shows a schematic diagram of a drilling system 10 with a drillstring 20 carrying a drilling assembly 90 (also referred to as the bottomhole assembly, or "BHA") conveyed in a "wellbore" or "borehole" 26 for drilling the borehole. The drilling system 10 includes a conventional derrick 11 erected on a floor 12 which supports a rotary table 14 that is rotated by a prime mover such as an electric motor (not shown) at a desired rotational speed. The drillstring 20 includes tubing such as a drill pipe 22 or a coiled-tubing extending downward from the surface into the borehole 26. The drillstring 20 is pushed into the borehole 26 when a drill pipe 22 is used as the tubing. For coiled-tubing applications, a tubing injector, such as an injector (not shown), however, is used to move the tubing from a source thereof, such as a reel (not shown), to the borehole 26. The drill bit 50 attached to the end of the drillstring breaks up the geological formations when it is rotated to drill the borehole 26. If a drill pipe 22 is used, the drillstring 20 is coupled to a drawworks 30 via a kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ placed in the line 38 can provide information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In one embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module may contain sensors, circuitry, and processing software and algorithms relating to the dynamic drilling parameters. Such parameters can include bit bounce, stick-slip of the drilling assembly, backward rotation, torque, shocks, borehole and annulus pressure, acceleration measurements, and other measurements of the drill bit condition. A suitable telemetry or communication sub 77 using, for example, two-way telemetry, is also provided as illustrated in the drilling assembly 90. The drilling sensor module processes the sensor information and transmits it to the surface control unit 40 via the telemetry system 77.

The communication sub 77, a power unit 78 and an MWD tool 79 are all connected in tandem with the drillstring 20. Flex subs, for example, are used in connecting the MWD tool 79 in the drilling assembly 90. Such subs and tools may form the bottom hole drilling assembly 90 between the drillstring 20 and the drill bit 50. The drilling assembly 90 may make various measurements including the pulsed nuclear magnetic resonance measurements while the borehole 26 is being drilled. The communication sub 77 obtains the signals and measurements and transfers the signals, using two-way telemetry, for example, to be processed on the surface. Alternatively, the signals can be processed using a downhole processor at a suitable location (not shown) in the drilling assembly 90.

The surface control unit or processor 40 may also receive one or more signals from other downhole sensors and devices and signals from sensors $S_1$-$S_3$ and other sensors used in the system 10 and processes such signals according to programmed instructions provided to the surface control unit 40.

The surface control unit 40 may display desired drilling parameters and other information on a display/monitor 44 utilized by an operator to control the drilling operations. The surface control unit 40 can include a computer or a microprocessor-based processing system, memory for storing programs or models and data, a recorder for recording data, and other peripherals. The control unit 40 can be adapted to activate alarms 42 when certain unsafe or undesirable operating conditions occur.

The apparatus for use with the present disclosure may include a downhole processor that may be positioned at any suitable location within or near the bottom hole assembly. The use of the processor is described below.

Figure 2:
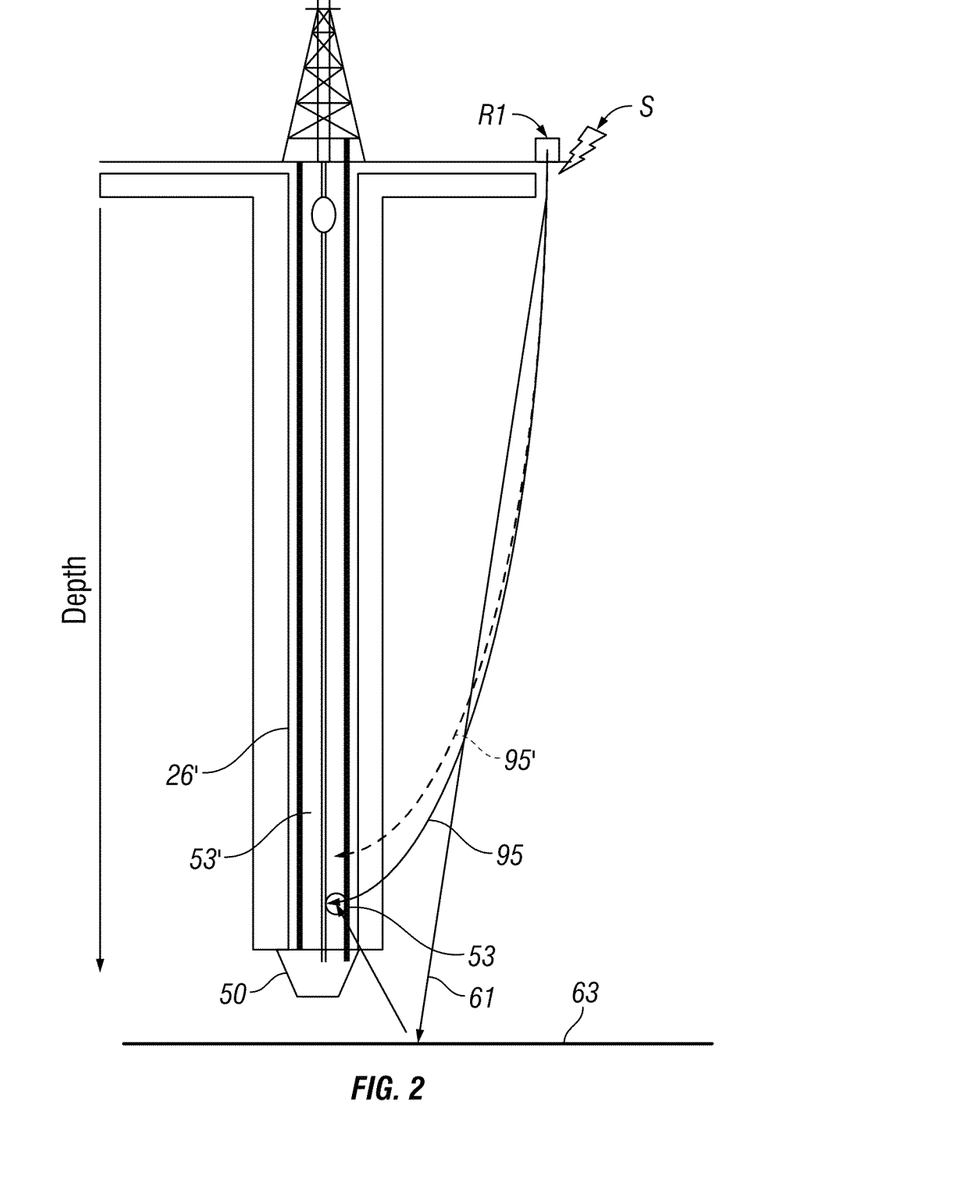
FIG. 2 illustrates the arrangement of source and sensors for one embodiment according to the present disclosure.

Turning now to FIG. 2, an example is shown of source and receiver configurations for the method of the present disclosure. Shown is a drillbit 50 near the bottom of a borehole 26'. A surface seismic source is denoted by S and a reference receiver at the surface is denoted by R1. A downhole receiver is denoted by 53, while 95 shows an exemplary raypath for seismic waves originating at the source S and received by the receiver 53. The receiver 53 is usually in a fixed relation to the drillbit in the bottomhole assembly. Also shown in FIG. 2 is a raypath 95' from the source S to another position 53' near the bottom of the borehole. This other position 53' could correspond to a second receiver in one embodiment of the disclosure wherein a plurality of seismic receivers are used downhole. In an alternate embodiment of the disclosure, the position 53' corresponds to another position of the receiver 53 when the drillbit and the BHA are at a different depth.

Raypaths 95 and 95' are shown as curved. This ray-bending commonly happens due to the fact that the velocity of propagation of seismic waves in the earth generally increases with depth. Also shown in FIG. 2 is a reflected ray 61 corresponding to seismic waves that have been produced by the source, reflected by an interface such as 63, and received by the receiver at 53.

Figure 3:
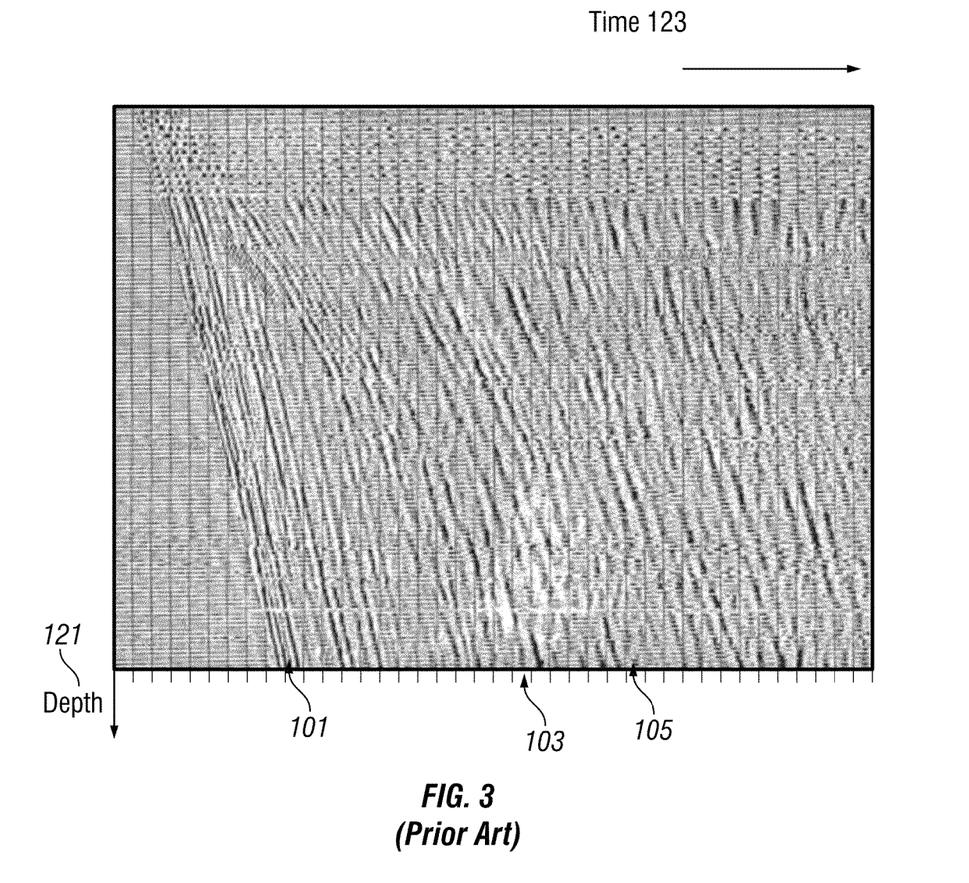
FIG. 3 shows an exemplary vertical seismic profile for use with one embodiment according to the present disclosure.

An example of a VSP that would be recorded by such an arrangement is shown in FIG. 3. The vertical axis 121 corresponds to depth while the horizontal axis 123 corresponds to time. The exemplary data in FIG. 3 was obtained using a wireline for deployment of the receivers. Measurements were made at a large number of depths, providing the large number of seismic traces shown in FIG. 3.

Even to an untrained observer, several points are apparent in FIG. 3. One point of interest is the direct compressional wave (P-wave) arrival denoted by 101. This corresponds to energy that has generally propagated into the earth formation as a P-wave. Also apparent in FIG. 3 is a direct shear wave (S-wave) arrival denoted by 103. Since S-waves have a lower velocity of propagation than P-waves, their arrival times are later than the arrival times of P-waves.

Both the compressional and shear wave direct arrivals are of interest since they are indicative of the type of rock through which the waves have propagated. To one skilled in the art, other visual information is seen in FIG. 3. An example of this is denoted by 105 and corresponds to energy that is reflected from a deeper horizon, such as 63 in FIG. 2 and moves up the borehole. Consequently, the "moveout" of this is opposite to the moveout of the direct arrivals (P- or S-). Such reflections are an important part of the analysis of VSP data since they provide the ability to look ahead of the drillbit. The stacked data can then be processed using prior art methods for producing an image of the subsurface. Commonly used processing methods include separation of downgoing and upcoming waves. The produced image may then be used for estimating the location of an interface ahead of the drillbit. Of particular importance is the ability to do this in real-time and control the drilling operations, such as the direction of drilling, based on the identified location of the interface.

In the present disclosure, for a single measurement during, for example, a connection time, a sequence of several shots is performed. This is defined as a "shooting sequence" and involves activation of the seismic source. During the shooting sequence, the source and the receiver do not move. The time interval between the shots is a predefined constant quantity known to the downhole processor. In one embodiment of the disclosure, the number of shots in a sequence is also known to the downhole processor, though this is not to be construed as a limitation. The exact time when a shooting sequence starts is not known to the downhole processor. All that is known a priori is that one or several shooting sequences might occur at some time after recording is initiated. The problem then is to determine the time interval(s) at which the seismic signals produced by the shooting sequence(s) is/are received downhole.

Figure 4:
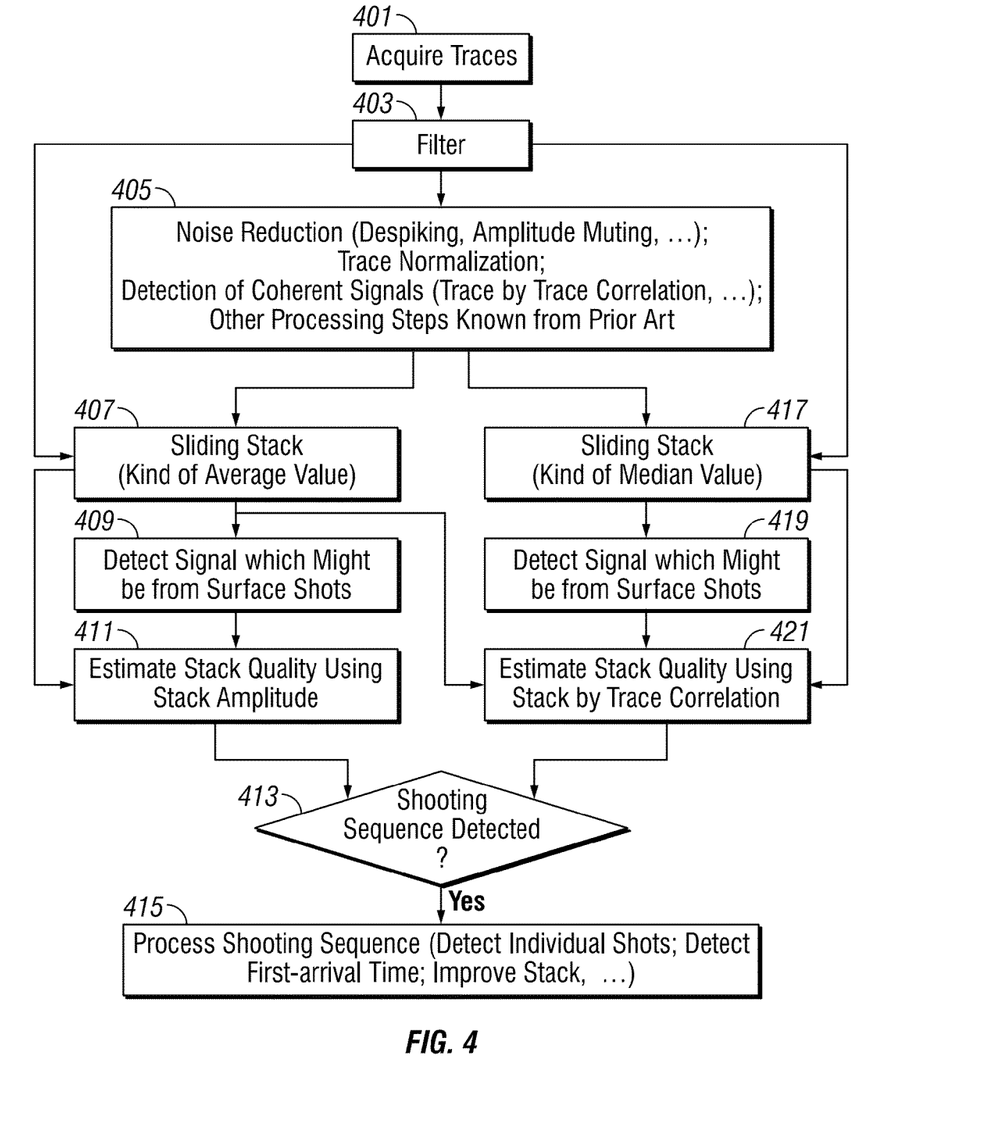
FIG. 4 shows a flow chart of a method according to one embodiment of the present disclosure.

Turning now to FIG. 4, a flow chart of an embodiment of the method of the present disclosure is shown. As an example, if a shooting sequence consists of N shots, then M signals are recorded 401 at starting times equal to the known time interval T between the shots. The length of each signal could be less than T.

Each of the M signals is then filtered 403. In the exemplary method according to one embodiment of the present disclosure, the filtering step 403 may use a bandpass filter for filtering a pass-band of frequencies corresponding to the known spectrum of the source (which may have been measured earlier). In one embodiment of the disclosure, the bandpass filter may include a correction for absorption based on an average attenuation in the earth and the expected traveltime for the seismic signals.

A number of optional processing steps may be carried out on the filtered data 403. These include identification of noisy signals. This may be based on identification of noise spikes on the signals or when the root-mean-square (RMS) level of the signal exceeds a threshold. Noisy spikes might be reduced by despiking. Noisy signals thus identified are zeroed out. It should be noted that zeroing the signals does not decrease the number of signals in a stack. In contrast, deleting the signals does decrease the number of signals. The amplitudes of the signals may be normalized 407 except, of course, the signals that have been zeroed out. The normalization improves the results of the subsequent processing steps. Coherent signals are detected using signal by signal correlation. The time of these coherent signals could be used to define the signal segment to be analyzed.

An important step of the present disclosure is the sliding stack, discussed further below with reference to FIGS. 5a-d. The sliding stack may be implemented as an averaging operation 407 or as a median stacking operation 417. The stack quality is estimated using the stack amplitude 411, or by performing a signal correlation 421. Optionally, prior to estimating the stack quality, signals which may result from surface shots are identified 409, 419.

Based on the estimated stack quality, a decision is made whether a shooting sequence has been detected 413. If a shooting sequence is detected, then the sequence is processed 415 to produce at least one seismic trace corresponding to the individual shots, estimate the first arrival time and further improve the stack.

Figure 5A:
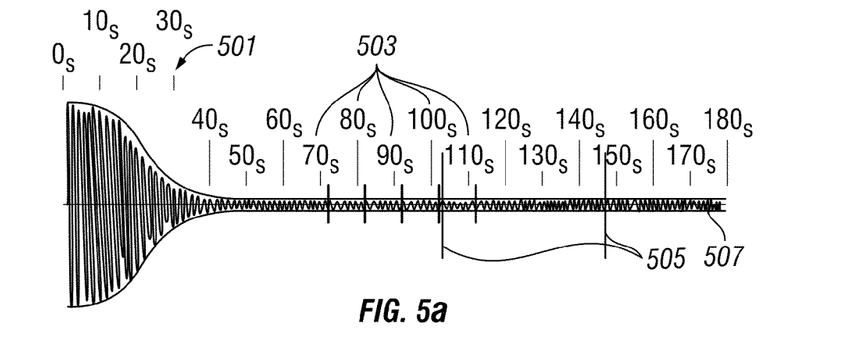
FIGS. 5a-5d illustrate one embodiment of the method according to the present disclosure.

FIGS. 5a-d illustrate the process of the sliding stack. Shown in FIG. 5a is a time sequence: the abscissa is time and markers are shown at 10 s intervals corresponding to the known time interval between the shots of the shot sequence. For this example, 180 s of data 507 recorded downhole are shown. During the interval 501 there is a decrease in the noise level as the mud flow is terminated. Recording may be started using a signal from a surface location or detecting a decrease in mud flow. Five shots of the shot sequence are denoted by 503. At times indicated by 505, there are noise spikes shown. These could occur, for example, due to impact on the drill string. The background noise between 40 s and 180 s has a quasi constant level (probably due to the rig generators). As can be seen, the time interval defined by the plurality of signals includes the time interval defined by the activation of the source.

The first step of the processing flow is to split the data stream into seismic signals. The signals may start at times multiples of 10 s (e.g. 0 s, 10 s, 20 s, 30 s, 40 s, . . . ). The 10 seconds corresponds to the known shooting interval time (i.e. if the shooting interval is 15 seconds, then the signals would start at seconds 0, 15, 30, 45, . . . ). This is denoted by 401 in FIG. 4. The second step 403 is to apply a high-pass filter, which remove the low frequencies from the data (usually less than 5 Hz). This is depicted in 403. The next step is to normalize the amplitudes of the signals. Please note that the above steps could be also applied on signal segments. For example, we could program the downhole tool (at surface or by downlink) to use for the normalization only the signal segments between the first and the fourth second of the signal. This is illustrated in FIG. 5b.

Figure 5B:
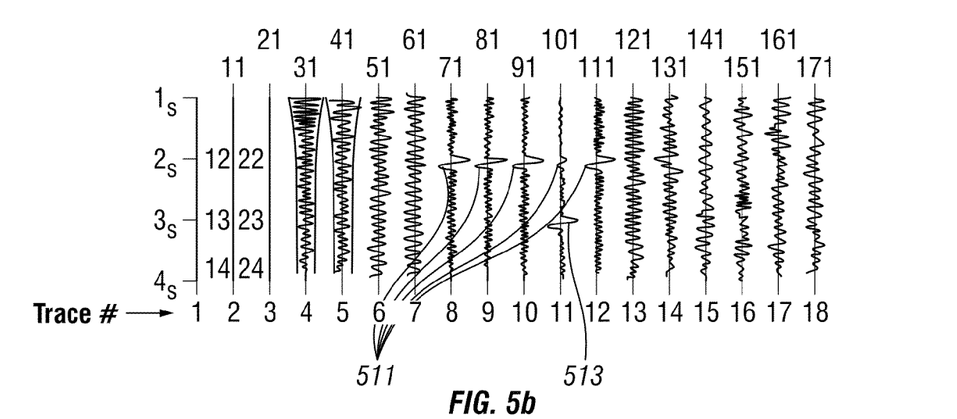

The amplitudes of the first three signals in FIG. 5b are muted (set to zero) because the data were too noisy. The shooting sequence starts at signal 8 and ends at signal 12. The signal generated by the shots is indicated by 511. Please note that the signal generated by the shots is only simplified drawn in this sketch (e.g. frequency content and shape of the signal are not realistic). For four signals in that sequence the largest amplitude is the amplitude of the seismic shot. For signal number 11, the largest amplitude is the amplitude of the spiky noise 513. In one embodiment, the signal is normalized to the amplitude of the spike. In another embodiment, an additional processing step (despiking) 405 is performed between filtering and "amplitude normalization".

Figure 5C:
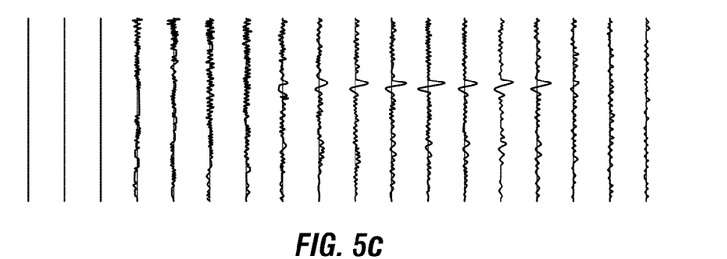
Figure 5D:
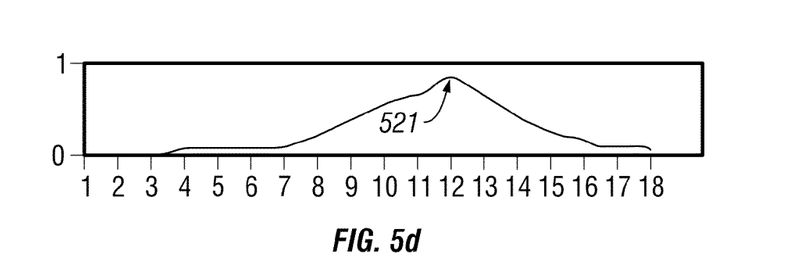

FIG. 5c shows the result of a sliding stack with 5 signals. There are several ways to stack the seismic signals (to add all amplitudes; to throw extreme amplitudes away; to use a median stack). In the example shown in FIG. 5c, all amplitudes are added and divided by 5 (the number of signals in the stack). Note that for the first four signals, we stack less than 5 signals, but we still divide the result by 5. Alternative implementations for the first four signals are also possible. The quality of the stack is given by the largest amplitude in the stack. In the example shown in FIG. 5d, because the signals generated by the seismic shots stack constructively, the "quality" of the stack will increase during the shooting sequence and get a maximum value at the end of the shooting sequence. See 521. This enables determination of the end of the shooting sequence if the number of shots in the sequence is not known ahead of time. An alternate implementation performs a sliding stack using only median values, and estimating the quality by using a cross-correlation between the median stack and the individual signals.

It is to be noted that the algorithm for determining the end of the shooting sequence is a function of the method which was used to stack the data in the sliding stack. It is also possible that the number of seismic shots is not known downhole. In some cases the quality function get a plateau with large values. The time of the last value of the plateau corresponds to the time when the shooting sequence ends. It is also possible to change the number of shots per sequence following a predefined system. It should also be pointed out that the term "shot" is to be given its broadest possible interpretation and includes, but is not limited to, activation of one or more of: an airgun, a vibrator sweep and/or a chirp signal.

The result of the sliding stack may be then correlated with the individual signals 421. This will give a time shift, which can then be used for subsequent processing of the individual signals. It is possible that a shooting sequence may include some missing shots. This could be due to shooting problems, or it may be used to communicate data downhole using the absence of shots. Similarly, the detection of time shifts within a sequence may also be indicative of shooting problems, or it may be a way of communicating data downhole. After applying the detected time shifts, an improved stack may be obtained.

In one embodiment, the detected shooting sequence is further processed (detect individual signals, detect first-arrival time, improve stack, etc.). These determined values are then used for further processing of the data including, for example, identifying reflections in the recorded data and producing an image of the earth formation.

The method described above could be also used to detect several shooting sequences during a measurement window. This is usually the case for measurement while tripping. It is also possible to have several sequences during a connection time while drilling. In addition, a plurality of shooting sequence may be used for a single measurement window by using more than one source, by changing the position of the source, and/or by changing the position of the receivers.

The present disclosure has been described in the context of VSP data acquisition in which a seismic source is at or near a surface location. However, the disclosure could also be used when the seismic source is located in a preexisting borehole. With such an arrangement, cross-well measurements could be made during the process of drilling a borehole. Based on these cross-well measurements, the position of the borehole being drilled from a preexisting borehole can be determined and, based on the determined distance, the drilling direction of the borehole can be controlled.

The processing of the data may be done by a downhole processor and/or a surface processor to give corrected measurements substantially in real time. Implicit in the control and processing of the data is the use of a computer program on a suitable machine readable medium that enables the processor to perform the control and processing. The machine readable medium may include ROMs, EPROMs, EEPROMs, Flash Memories, and Optical disks. Such media may also be used to store results of the processing.

While the foregoing disclosure is directed to specific embodiments of the disclosure, various modifications will be apparent to those skilled in the art. It is intended that all such variations within the scope and spirit of the appended claims be embraced by the foregoing disclosure.

We claim:

1. A method of producing a seismic trace during drilling operations using a data stream generated by a sensor on a bottomhole assembly (BHA) in a borehole in an earth formation, the method comprising:

producing the seismic trace by performing a sliding stack on a plurality of traces corresponding to a plurality of seismic signals to generate a plurality of stacked traces, with each trace of the plurality of traces based on a corresponding seismic signal of the plurality of seismic signals, and each corresponding seismic signal comprises a different corresponding interval of data from the data stream, wherein each corresponding interval of data relates to a different corresponding activation of a seismic source, the plurality of seismic signals being based on a sequence of seismic pulses having a predefined interval between successive seismic pulses.

2. The method of claim 1, further comprising:
activating the seismic source at a surface location.

3. The method of claim 1 further comprising defining a starting time of the interval using one of: (i) a signal from a surface location, and (ii) a measurement of mud-flow.

4. The method of claim 1 wherein identifying a starting time further comprises performing at least one of the following on each of the plurality of seismic signals: (i) a signal balancing, (ii) a filtering, (iii) a zeroing of a noisy signal, (iv) an amplitude normalization, and (v) a cross-correlation.

5. The method of claim 1 further comprising:
using the sliding stack to estimate at least one of: (i) an ending time of the sequence, and (ii) a number of activations of the source in the sequence.

6. The method of claim 1, using, for the sliding stack, a stacking selected from: (i) an average of the plurality of seismic signals, and (ii) a median value of the plurality of seismic signals.

7. The method of claim 1 further comprising:
generating an image of the earth formation using the seismic trace.

8. The method of claim 7 further comprising:
estimating a position of an interface ahead of a drill bit using the image of the earth formation.

9. The method of claim 1 further comprising:
cross-correlating the seismic trace with at least one of the plurality of seismic signals; and
determining a time shift therebetween.

10. The method of claim 1, wherein generating the plurality of stacked traces comprises:
combining, for a selected plurality of chronologically ordered subsets of the plurality of traces, each trace of a subset to generate a corresponding chronologically ordered stacked trace;
wherein the selected plurality of chronologically ordered subsets each has a number of traces equal to a selected fold value.

11. The method of claim 10, wherein combining each trace of the subset comprises adding together each trace of the subset.

12. A system for evaluating an earth formation during drilling operations, the system comprising:
a bottomhole assembly (BHA) configured to be conveyed into a borehole for performing drilling operations;
a seismic source at a surface location configured to be activated with a predefined sequence including a specified interval between successive activations;
a sensor on the BHA configured to generate a data stream including a plurality of seismic signals, wherein each seismic signal comprises a different corresponding interval of data from the data stream, and wherein each signal is generated over a time interval that includes the activation of the seismic source; and
a processor configured to:
(i) perform a sliding stack on a plurality of traces corresponding to the plurality of seismic signals to generate a plurality of stacked traces, with each trace of the plurality of traces based on a corresponding seismic signal of the plurality of seismic signals, with each trace of the plurality of traces based on a corresponding seismic signal; and
(ii) produce a seismic trace using the sliding stack.

13. The system of claim 12 wherein a starting time of the interval is defined using one of: (i) a signal from a surface location, and (ii) a measurement of mud-flow.

14. The system of claim 12 wherein the processor is further configured to use the result of the sliding stack to estimate at least one of: (i) an ending time of the sequence, and (ii) a number of activations of the source in the sequence.

15. The system of claim 12 wherein the processor is further configured to perform the sliding stack by performing a stacking selected from (i) an averaging of the plurality of seismic signals, and (ii) determining a median value of the plurality of seismic signals.

16. The system of claim 12 wherein the processor is further configured to use a result of the sliding stack for providing an image of the earth formation.

17. The system of claim 16 wherein the processor is further configured to estimate a position of an interface ahead of a drill bit using the image of the earth formation.

18. The system of claim 12 wherein the processor is further configured to cross-correlate the seismic trace with at least one of the plurality of seismic signals and determine a time-shift therebetween.

19. A non-transitory computer-readable medium product having stored thereon instructions that when read by at least one processor cause the at least one processor to perform a method of producing a seismic trace during drilling operations using a data stream generated by a sensor on a bottomhole assembly (BHA) in a borehole in an earth formation, the method comprising:
producing the seismic trace by performing a sliding stack on a plurality of traces corresponding to a plurality of seismic signals to generate a plurality of stacked traces, with each trace of the plurality of traces based on a corresponding seismic signal of the plurality of seismic signals, and each corresponding seismic signal comprises a different corresponding interval of data from the data stream, wherein each corresponding interval of data relates to a different corresponding activation of a seismic source, the plurality of seismic signals being based on a sequence of seismic pulses having a predefined interval between successive seismic pulses.

20. The non-transitory computer-readable medium product of claim 19 further comprising at least one of:
(i) a ROM, (ii) an EPROM, (iii) an EEPROM, (iv) a flash memory, and (v) an optical disk.

* * * * *